United States Patent [19]

Scott et al.

[11] Patent Number: 5,197,794
[45] Date of Patent: Mar. 30, 1993

[54] VEHICLE LAMP AIMING DEVICE

[75] Inventors: Michael T. Scott, Columbus; Robert L. King, Seymour, both of Ind.; Hugh T. Bradley, Northville, Mich.

[73] Assignee: GTE Products Corporation, Danvers, Mass.

[21] Appl. No.: 632,571

[22] Filed: Dec. 24, 1990

[51] Int. Cl.⁵ .............................. F21M 3/20
[52] U.S. Cl. ........................ 362/66; 362/80; 362/428; 33/370
[58] Field of Search ........... 362/61, 66, 80, 287, 362/428; 33/365, 376, 288

[56] References Cited

U.S. PATENT DOCUMENTS

| | | | |
|---|---|---|---|
| 5,055,980 | 10/1991 | Mochizuki | 362/61 |
| 5,063,480 | 11/1991 | McMahan et al. | 362/61 |
| 5,065,293 | 11/1991 | Mochizuki | 362/61 |
| 5,068,769 | 11/1991 | Umeda | 362/61 |
| 5,077,642 | 12/1981 | Lisak | 362/66 |

Primary Examiner—Richard R. Cole
Attorney, Agent, or Firm—William E. Meyer

[57] ABSTRACT

A vehicle lamp aiming device is disclosed having an adjustment shaft with a first marking, and a mounting nut with a second marking. One of the other of the markings is formed on a clip firmly, but still adjustably mounted to either the shaft or nut as the case may be. Initial proper alignment of the adjustment shaft amy be made with respect to the mounting nut. The vehicle lamp is then in proper alignment. The adjustable marking clip is then moved to set the lamp calibration. A replacement lamp may then be brought into proper alignment by threading the adjustment shaft to align the alignment marks. By using a firm clip, subsequent, inadvertent resetting of the clip may be avoided.

22 Claims, 4 Drawing Sheets

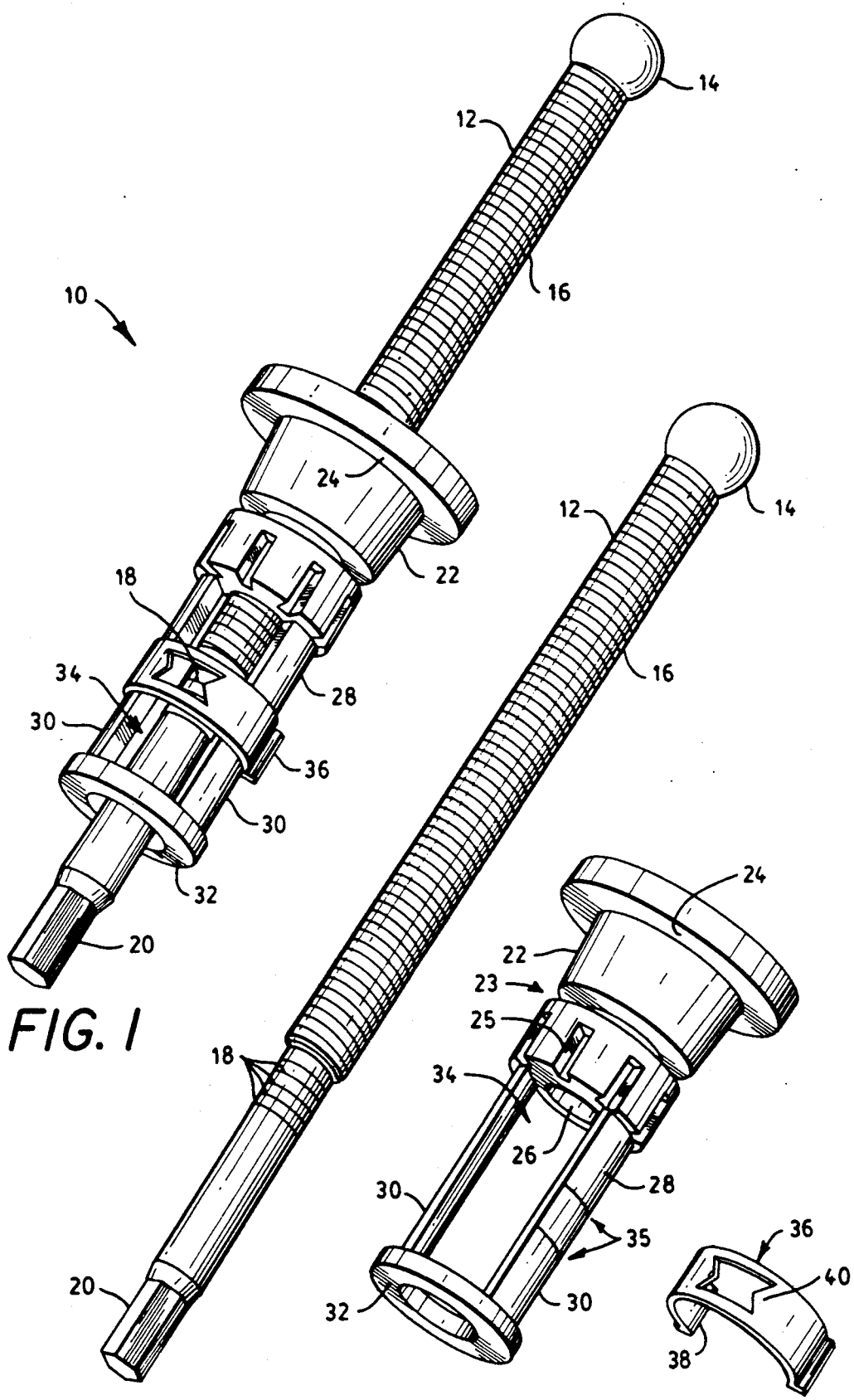

VEHICLE LAMP AIMING DEVICE

TECHNICAL FIELD

The invention relates to vehicle lamps and particularly to vehicle lamp aiming hardware. More particularly the invention is concerned with a calibration device for vertical, or horizontal aiming a vehicle headlamp.

BACKGROUND ART

Vehicle lamps, such as headlamps, are commonly mounted to a vehicle frame by threaded adjustment shafts. By threading one or more of the adjustment shafts, the orientation of the headlamp with respect to the vehicle may be changed. The headlamp is then aimed by properly screwing the adjustment shafts in or out until the lamp is pointed correctly. It is also common practice to use a ball and socket type coupling to join the headlamp, or equivalently a headlamp support frame, to an end of the adjustment shaft. In some designs, the adjustment shafts extend from the vehicle to the headlamp, and in others the design is reversed, so the shafts extend from the headlamp frame to the vehicle. In some designs there are three adjustment shafts, in some there are only two. Typically, one vertical and one horizontal adjustment shaft are used with one pivot shaft. If three ball and socket adjustment shafts are used, the head lamp may be clipped on or off for easy installation.

In manufacturing an automobile, the headlamp needs to be properly aligned before the final sale. Alignment takes time, and therefore costs the consumer money. A headlamp may be aligned by shining the lamp on a screen marked with a proper aligned region. By adjusting the lamp mounts, the projected beam may be properly aligned. Manual alignment is too time consuming to be acceptable. Computer driven feed back systems may be used to replace manual labor methods, but even computer driven adjusters take time along the assembly process. Proper initial manufacture should be able to reduce or eliminate the need for time consuming adjustment. There is then a need for a substantially prealigned headlamp for use in automobile manufacture.

Vehicle lamps may fail or may be damaged and therefore need to be replaced. Replacement may be done by the vehicle owner without access to a proper vehicle lamp alignment facility. The result is then a poorly aligned vehicle lamp. Replacement may also be performed at a service center where labor is expensive, so a quick alignment procedure is needed. There is then a general need for a mechanism to assist proper alignment of a vehicle lamp.

Headlamps are being made with a smaller vertical profile to help enhance vehicle aerodynamics. The reduced profile headlamps have too small a vertical extension to be easily aimed like older lenses, where three aiming pads were formed on the lens face to which an aiming device could be attached. The aiming pads could be used by a computer driven robot in a factory setting, or by a human observing a bubble gauge device in a service center. For the low profile lamps, there may be too little vertical separation to adequately adjust the lamps. As a result there is a need for an alternative means for adjusting headlamp aiming in service centers and elsewhere, and in particular without the need for special alignment equipment.

Examples of the prior art are shown in U.S. Pat. Nos. 3,949,215; 4,188,655; 4,293,897; and 4,318,162.

U.S. Pat. No. 3,949,215 issued Apr. 6, 1976 to George Whitney for Lamp Assembly threaded shafts with ball and socket couplings for use in headlamp alignment hardware. Three threaded shafts extend from a support plate to couple in ball sockets formed on the lamp housing.

U.S. Pat. No. 4,188,655 issued Feb. 12, 1980 to Thomas G. Tallon for Vehicle Headlamp and Mounting Assembly shows threaded shaft and ball and socket couplings used in headlamp alignment hardware. Two threaded shafts are shown extending from the lamp housing to threaded couplings in the vehicle, while a single ball pivot forms the third support.

U.S. Pat. No. 4,293,897 issued Oct. 6, 1981 to Alain Deverrewaere for Motor Vehicle Headlamp shows several ball and socket type couplings used in headlamp alignment hardware. Screws extend from a casing to ball sockets formed in the lamp housing.

U.S. Pat. No. 4,318,162 issued Mar. 2, 1982 to Jiri G. Sip for Snap in Coupling Assembly for A Vehicle Headlamp shows ball and socket couplings used in headlamp aiming hardware. One shaft is shown extending from the vehicle to a ball socket formed on the lamp housing, while a second shaft is shown extending from the lamp housing to a ball socket formed on the vehicle.

The National Highway Traffic Safety Administration (NHTSA) has published additional requirements for on vehicle headlamp aiming features (FMVSS 108 S7.7.5.2). The requirements are for readable markings related to proper headlamp adjustment. In particular, a zero marking is required, along with regular gradations of no more than 0.19 degrees each from 1.2 degrees azimuthal above and below horizontal. The aiming accuracy is to be 0.1 degrees or better. A similar horizontal aiming requirement is also established. A zero mark is required along with regular gradations of not more than 0.38 degrees left and right of forward for a range of at least 0.76 degrees left and right with an accuracy of 0.1 degrees or better. The horizontal indicator shall be recalibratable over a range of 2.5 degrees right or left of forward. These standards were published in the Federal Registry, Vol. 54, No. 88, Tuesday May 9, 1989, p. 20079-20080.

DISCLOSURE OF THE INVENTION

An improved vehicle lamp aiming device may be formed by an adjusting shaft assembly having a shaft with a first coupling, a threaded portion, and a first calibration mark coupled to the shaft, and a threaded element coupled to the shaft, a second calibration marked on the threaded element and a second coupling formed on the threaded element. In one embodiment, a mounting nut with an internal threaded passage is threaded to an adjusting shaft. The mounting nut further includes a mounting face, and a marker support. A marker having at least one location mark is coupled to the mounting nut whereby the marker may be registered with respect to the shaft calibration mark to mark the proper threading of the adjusting shaft with respect to the mounting nut. In the preferred embodiment, a sliding marker is coupled to the mounting nut along a cut out portion of the nut adjacent the adjusting shaft. The sliding marker may be properly registered with respect to the adjustment shaft initially, and thereafter used to reset the adjustment shaft, and the coupled lamp to a proper setting.

BRIEF DESCRIPTION OF THE DRAWINGS

FIG. 1 shows a preferred embodiment of a vehicle lamp aiming device.

FIG. 2 shows the adjusting shaft of FIG. 1.

FIG. 3 shows the mounting nut of FIG. 1.

FIG. 4 shows the location marker of FIG. 1.

BEST MODE FOR CARRYING OUT THE INVENTION

Figures 5, 6, 7, 8:
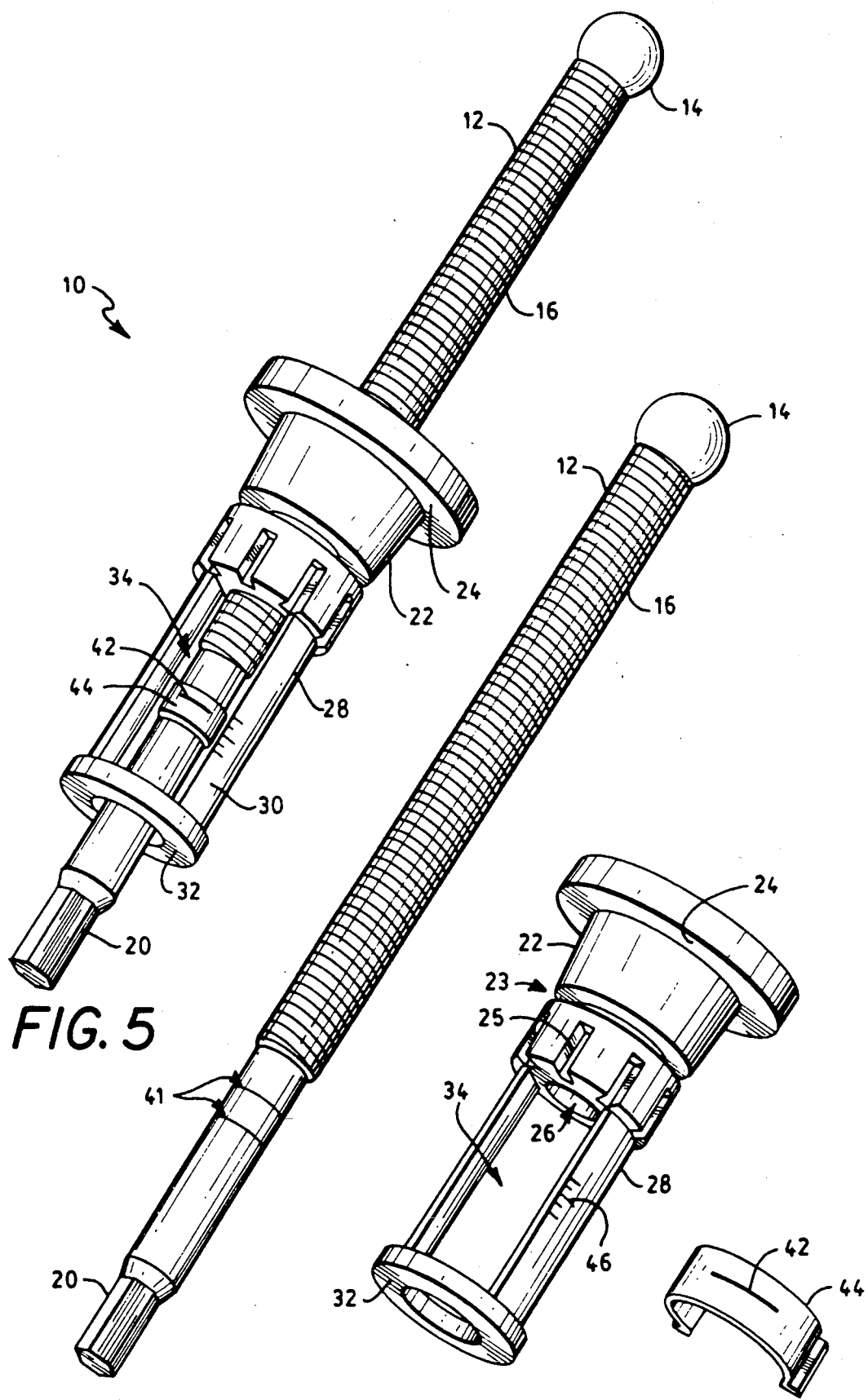
FIG. 5 shows an alternative embodiment of a vehicle lamp aiming device.
FIG. 6 shows the adjusting shaft of FIG. 5.
FIG. 7 shows the mounting nut of FIG. 5.
FIG. 8 shows the location marker of FIG. 5.

FIG. 1 shows a preferred embodiment of a vehicle lamp aiming device 10. The vehicle lamp aiming device 10 is assembled from an adjusting shaft 12, a mounting nut 22, and a location marker 36.

FIG. 2 shows an adjusting shaft 12. The adjusting shaft 12 has a first coupling 14, a threaded portion 16, at least one calibration mark 18, and a second coupling 20. Positioned along adjusting shaft 12 is a first coupling 14. The first coupling 14 joins with a vehicle lamp, a vehicle lamp housing or is otherwise coupled to a vehicle lamp, so axial motion of the adjusting shaft 12 shifts the vehicle lamp alignment. In the preferred embodiment, a first end of the adjusting shaft 12 is formed as a ball to make the first coupling 14. The ball may be coupled to a ball socket type clip familiar in vehicle lamp positioning hardware.

Running axially along a portion of the adjusting shaft 12 may be a threaded portion 16. Also positioned along adjusting shaft 12 is at least one calibration mark 18. A convenient location for the calibration mark 18 is axially offset from the end of the threaded portion 16. The preferred embodiment includes a series of calibration marks 18. One calibration mark, a zero mark, may indicate a zero degree, forward, beam alignment for the lamp. Adjacent additional calibration marks may indicate regular angular changes in the beam direction. For example, each calibration mark may indicate equal increments either right or left of forward; or above or below horizontal. For the preferred vertical adjustment embodiment, a zero marking is formed on the adjustment shaft, along with regular gradations corresponding to no more than 0.19 degrees each of elevation from 1.2 degrees azimuthal variation above and below horizontal. The preferred aiming accuracy should be be 0.1 degrees or better. For the preferred horizontal adjustment embodiment, a zero mark is formed along the adjustment shaft with regular gradations corresponding to variations of not more than 0.38 degrees left and right of forward for a range of at least 0.76 degrees left and right. Again, the preferred accuracy is 0.1 degrees or better left and right. The preferred horizontal aiming device should be recalibratable over a range of 2.5 degrees right or left of forward.

The adjusting shaft 12 may also include a second coupling 20 for rotational adjustment of the adjusting shaft 12. In the preferred embodiment, the second shaft end, the end opposite the first coupling 14 is formed as a hexagonal end to make the second coupling 20. The adjusting shaft 12 may then be rotated with a small socket, or similar hexagonal coupling tool coupled to the second coupling 20. Alternatively, a slot for a screw driver, allen wrench or similar tool coupling may be formed on the second end of the adjusting shaft 12 to enable shaft rotation. By way of example, the adjusting shaft 12 is shown as a shaft with a ball coupling at a first end, a threaded midsection, a series of five calibration marks, and a hexagonal second shaft end for adjustment. The center calibration mark may be used as the zero mark. The order of the shaft elements may be altered, so there is a first coupling end, one or more calibration marks, a threaded portion, and an adjustment coupling.

FIG. 3 shows a mounting nut 22. The adjusting shaft 12 is threaded through the mounting nut 22. The mounting nut 22 has a mounting face 24, an internal threaded passage 26, and a marker support 28. The mounting nut 22 may have a calibration zero mark and additional scale marks covering a range of a few degrees above or below horizontal, or right and left of forward, as the case may be. In the preferred vertical adjustment embodiment, the center shaft mark 18, the zero mark, pairs with a mounting nut zero mark, and the scale extends form 1.2 degrees or more, above and below the horizontal in gradations of 0.19 degrees or less with an accuracy of 0.1 degrees or better with respect to the zero marks. In the preferred horizontal adjustment embodiment, the center shaft mark 18, the zero mark, pairs with a mounting nut zero mark, and the scale extends form 0.76 degrees or more, right or left, in gradations of 0.38 degrees or less with an accuracy of 0.1 degrees or better with respect to the zero marks. The mounting face 24 is designed to abut an element fixed to a vehicle, such as a grill opening reinforcement (GOR). By threading the adjusting shaft 12 in the mounting nut 22, the distance between the first coupling 14 and the mounting nut 22 may be varied. In particular, the distance from the first coupling 14 end joined to the vehicle lamp to the mounting face 24 abutting the vehicle to may be varied. The position of the lamp with respect to the vehicle may then be adjusted.

Also, positioned on the mounting nut 22 is a marker support 28, designed in the preferred embodiment to support a moveable marker 36 with a location mark 40. The marker support 28 is preferably a cut out portion of the mounting nut 22. A length of the adjusting shaft 12 may then be exposed for the full length of reasonable adjustment for viewing the adjustment shaft marks 18 in the cut out region of the mounting nut 22. For example, the adjusting shaft 12, and the calibration mark 18 may be exposed from a few degrees below alignment to a few degrees above alignment. In the preferred embodiment, there is a zero mark of the adjustment shaft that pairs with a zero mark on the mounting nut. In the preferred vertical adjustment embodiment, a scale extends from 1.2 degrees or more, above and below horizontal in gradations of 0.19 degrees or less with an accuracy of 0.1 degrees or better with respect to the zero marks. In the preferred horizontal adjustment embodiment, a scale extends from 0.76 degrees or more, left to right of forward in gradations of 0.38 degrees or less with an accuracy of 0.1 degrees or better with respect to the zero marks. On either side of and paralleling the adjusting shaft 12 to form a marker support 28 are two opposite beams 30. By way of example, the mounting nut 22 is shown as a threaded nut having a circular plate forming the mounting face 24 on one end. An internally threaded midsection couples to the adjusting shaft 12 along the threaded portion 16. Formed along the exterior length of the mounting nut 22, may be a ring slot 23 to receive a mounting clip. The preferred embodiment also includes latch slots 25 to couple with latches formed on the mounting clip. The threaded midsection of the mounting nut 22 also includes exteriorly formed faces to enable rotation of the mounting nut 22 with respect to the adjusting shaft 12, or for fixed mounting with respect to the vehicle. The exteriorly formed faces may accommodate a wrench or similar hand tool. Adjacent either side of the adjusting shaft 12 on the opposite side of the mounting nut 22 are two parallel beams 30. The two beams 30 may couple to a coaxially aligned ring 32 to strengthen the beam ends. The beams 30 and ring 32 form a window frame 34 displaying the adjusting shaft 12, and calibration marks 18. In the preferred embodiment, the beams 30 are marked with initial position marks 35. The initial position marks 35 calibrate the proper alignment position determined for the headlamp by the lamp manufacturer. After the headlamp is inserted in the automobile, if the headlamp is not properly aligned, then either the automobile, or the headlamp may have been improperly manufactured, or improperly manufactured with respect to each other. By performing time trends on the headlamp alignment, a proper alignment for the headlamp, with respect to the automobile as the two are actually manufactured may be determined. The initial alignment marks 35 may then be shifted in subsequent headlamps, thereby correcting the designed alignment to achieved the expected proper alignment.

FIG. 4 shows a moveable marker 36. The mounting nut 22 supports the moveable marker 36. In the preferred embodiment, the initial marks 35 show where the moveable marker 36 should be positioned initially. If the initial marks 35 are correct, the headlamp may be statistically aligned during lamp manufacture. If the initial alignment is incorrect, the initial marks 35 may be altered for subsequent headlamps, thereby statistically improving the headlamp alignment in the initial manufacture. The marker 36 has a marker coupling 38, and at least one location mark 40. By way of example, the moveable marker 36 is shown as a ring clip that firmly couples to the mounting nut 22 between the parallel beams 30 between the initial marks 35. The calibration marks 18 are located axially close to the location mark 40, so adjustment of the adjusting shaft 12 axially advances or withdraws the mounting nut 22. Motion of the adjustment shaft 12 with respect to the mounting nut 22 may be judged by comparing the calibration mark(s) 18 with the location mark(s) 40. In the preferred embodiment, the location marker 36 is firmly coupled to the mounting nut 22, but still adjustable with respect to the mounting nut 22. In particular, the preferred marker 36 is slidable along the parallel beams 30 with more than slight effort, and preferably firm effort. A vehicle lamp may then be properly aimed under factory conditions, and the marker 36 firmly set to indicate the proper threading of the adjusting shaft 12 with respect to the mounting nut 22. The firm clipping of the location marker 36 with respect to the mounting nut 22 deters inadvertent recalibration of the alignment indicated by the marker 36. Alternatively, the marker 36 may be detached from the mounting nut 22 and moved with respect to the mounting nut 22, and then reattached to the mounting nut 22. The vehicle lamp may then be properly adjusted with respect to the vehicle, and the marker 36 set properly adjacent the calibration mark 18.

Subsequent dismounting, and remounting of the vehicle lamp may be reset by threading the adjusting shaft 12 so the calibration mark 18 and location mark are aligned.

FIG. 5 shows an alternative embodiment of a vehicle lamp aiming device. The variation in FIG. 5 places the location mark 42 on an adjustable clip 44. The adjustable clip 44 is then tightly clipped to the adjusting shaft 12. FIG. 6 shows the adjusting shaft 12 of FIG. 5. with no calibration marks 18 scored directly on the adjusting shaft 12. The adjusting shaft may include initial marks 41. FIG. 7 shows the mounting nut 22 of FIG. 5. with calibration marks 46 scored on the beams 30, or frame portion of the mounting nut 22. FIG. 8 shows the adjustable clip 44 of FIG. 5. A single location mark 42 is scored transaxially on the adjustable clip 44. The adjustable clip 44 is designed to clip firmly to the adjusting shaft 12. By aligning the vehicle lamp, and then positioning the adjustable clip 44 along the adjusting shaft 12, the lamp alignment may be preserved. The structure of FIG. 5 in some regards is less desirable, as unthreading the mounting nut 22 from the adjusting shaft 12 may shift the location clip thereby loosing the proper lamp alignment marking. On the otherhand, the clip 44 is somewhat protected by the beams 30, and ring 32 that ward off unintended contact. By using a smaller shaft diameter, or larger diameter threaded passage 26, the adjustable clip 44 may be passed through the mounting nut 22 without being moved with respect to the shaft 12.

Figure 9:
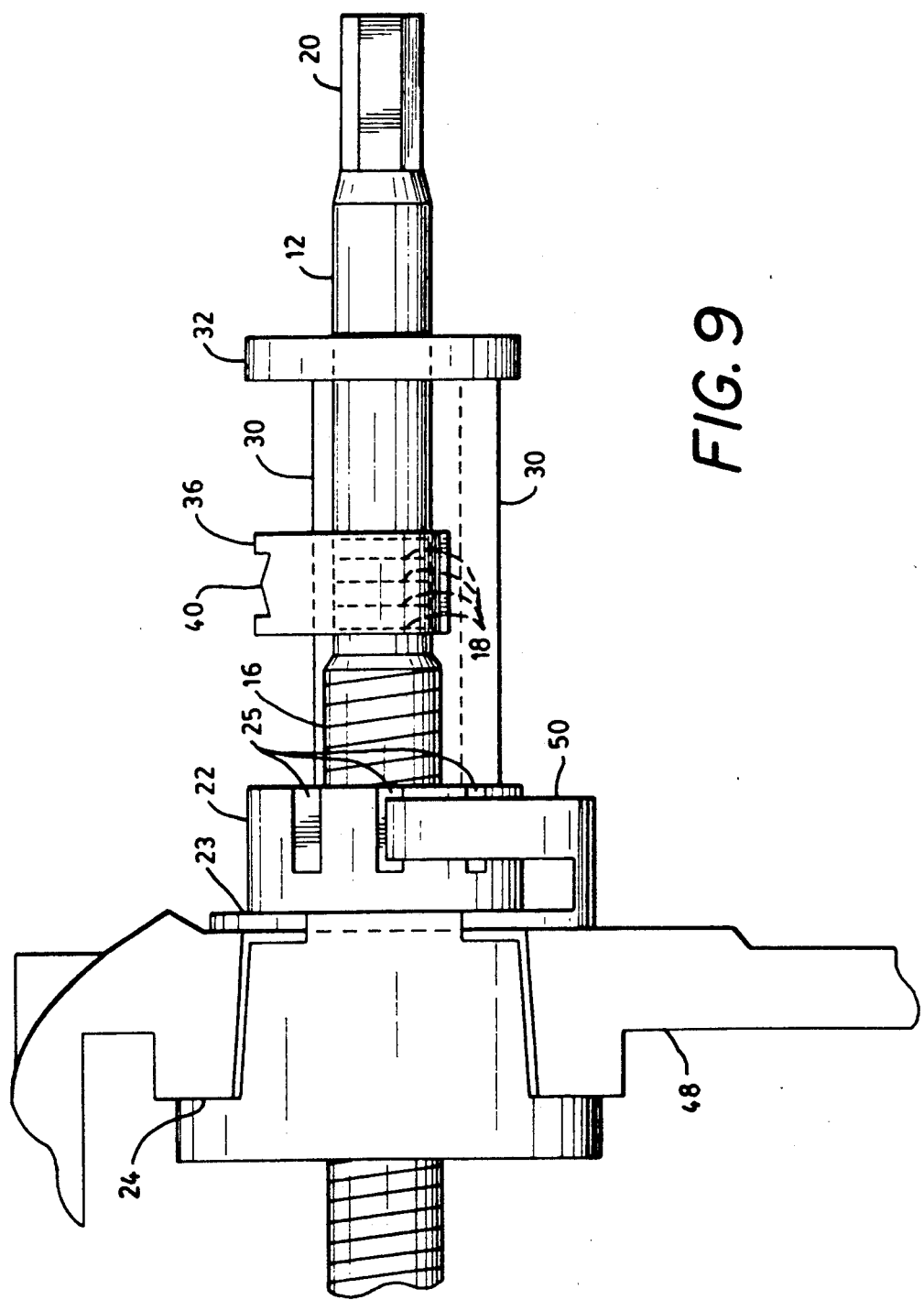
FIG. 9 shows a side view, partially in cross section, of the aiming device mounted in the GOR for a headlamp.

FIG. 9 shows a side view, partially in cross section, of the aiming device 10 mounted in the grill opening reinforcement 48 (GOR) for a headlamp. The mounting face 24 is positioned against the face of the grill opening reinforcement (GOR) 48. The ring slot 23 is positioned approximately coplanarly with the opposite side of the grill opening reinforcement (GOR) 48, so a locking clip 50 may be inserted around the ring slot 23 to capture the mounting nut 22 in the grill opening reinforcement 48. The preferred locking clip 50 is a U shaped clip with tips of the U extending up and back to latch in the axial latch slots 25 formed in the mounting nut 22.

Figure 10:
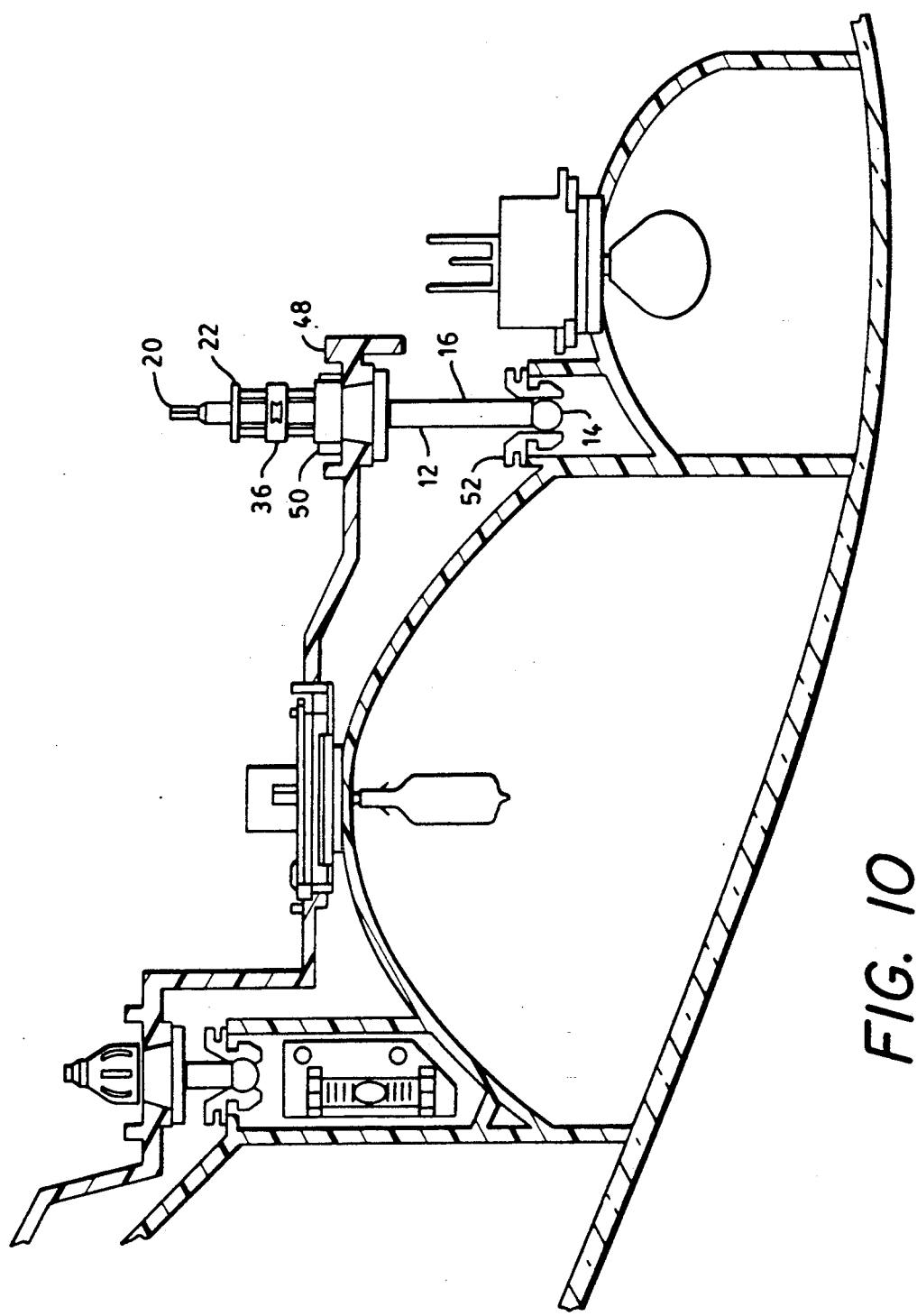
FIG. 10 shows a top view, partially in cross section, of the aiming device, a portion of a headlamp reflector, and a portion of a grill work.

FIG. 10 shows a top view, partially in cross section, of the aiming device 10, a portion of a headlamp reflector, and a portion of a grill work. The first end 14 is shown as a ball mounted in a socket coupler 52 that latches to the rear of the reflector body. The mounting nut 22 is threaded through a grill opening reinforcement 48, and clipped in place by a locking clip 50. By threading the adjusting shaft 12 the distance between the reflector and the grill opening reinforcement 48 may be changed. In the example shown, the adjusting shaft 12 rotates the lamp right or left of forward, thereby providing a horizontal adjustment. FIG. 10 also shows a second ball shaft coupling with a threaded nut for adjusting the shaft extension. The second ball shaft is designed to rotate the headlamp up or down, thereby providing a vertical adjustment. Adjacent the second shaft is a spirit level, a clear tube filled with a liquid and a bubble, to judge the proper vertical alignment of the headlamp.

To use and assemble the preferred headlamp adjustment device, a proper headlamp alignment is determined. Initial marks 35 are formed on the mounting nut 22, and the clip 36 is correctly positioned with respect to the initial marks 35. The adjusting shaft 12 is then threaded in the mounting nut 22 to align the adjusting shaft 12 and mounting nut 22 according to the initial marks 35 and clip 36. The adjusting shaft 12, mounting nut 22 and clip 36 are then coupled to the rear of the headlamp reflector. The headlamp with the one or more adjustment shafts 12 projecting from the rear is then mated with the grill opening reinforcement 48 (GOR) by positioning the mounting nut(s) 22 in receiving holes in the grill opening reinforcement 48 (GOR). A latching U clip 50 is then slipped over the mounting nut 22 projecting through the receiving hole, to clip in the ring slot 23. The mounting nut 22 may be turned a few degrees to latch the mounting nut 22 with the U clip 50. If the initial manufacture of the headlamp, and automobile are proper, no further assembly or adjustment should be needed. If a single headlamp is not properly aligned, the second coupling end 20, hexhead end, may be rotated to properly adjust the headlamp, and the clip 36 shifted to mark the new proper alignment. If the headlamp is statistically misaligned, for example, horizontal orientation of the automobile is consistently different then expected, then the initial marks 35 may be adjusted, thereby causing the initial headlamp set up to be altered. To remove the headlamp, the headlamp is either pulled off the ball ends, or the ball sockets are unlatched from the reflector back. In either case, the proper alignment is still preserved by the unrotated adjusting shaft.

While there have been shown and described what are at present considered to be the preferred embodiments of the invention, it will be apparent to those skilled in the art that various changes and modifications can be made herein without departing from the scope of the invention defined by the appended claims. In particular, as known in the art of vehicle lamp mounting, the first coupling and mounting nut coupling with the vehicle roles may be reversed. The preferred first coupling, a ball and socket coupling between the adjustment shaft and vehicle lamp, may then be made between the adjusting shaft and the vehicle, with the mounting nut coupling to the vehicle lamp. Threading the adjustment shaft still sets the distance between the vehicle, and the vehicle lamp, and the location marker still indicates the proper setting with respect to the calibration mark. In a similar fashion, the positions of the location marker and the calibration mark(s) may be reversed. In particular, the location mark may be placed on the adjusting shaft, and the calibration mark(s) placed on the location marker. Further, the adjustable location marker may be coupled to the adjusting shaft, and the calibration mark(s) formed on the mounting nut. A simple variation of the aiming device is to alter the order of the shaft elements.

What is claimed is:

1. A vehicle lamp aiming device comprising:
   a) an adjusting shaft having a first coupling, a threaded portion, and at least one shaft calibration mark
   b) a mounting nut, with an internal threaded passage threaded to the adjusting shaft, a mounting face in contact with an element fixed to a vehicle, and a marker support, and
   c) a marker positioned on the mounting nut having at least one location mark whereby the marker may be registered with respect to the shaft calibration mark to mark the threading of the adjusting shaft with respect to the mounting nut.

2. The aiming device in claim 1, wherein the adjusting shaft includes a series of calibration marks.

3. The aiming device in claim 1, wherein the marker is a clip ring.

4. The aiming device in claim 1, wherein the mounting nut includes a support frame for the marker.

5. The aiming device in claim 4, wherein the marker is adjustable along a length of the support frame.

6. The aiming device in claim 4, wherein the marker is an adjustable clip coupled along a length of the support frame.

7. The aiming device in claim 4, wherein the mounting nut support frame includes two parallel portions adjacent the adjusting shaft.

8. A vehicle lamp aiming device comprising:
   a) an adjusting shaft having a first coupling, a threaded portion, and at least one shaft calibration mark
   b) a mounting nut, with an internal threaded passage threaded to the adjusting shaft, a mounting face in contact with an element fixed to a vehicle, and an opening along a length of the adjusting shaft long enough to expose a predetermined proper range of the adjustment shaft, and
   c) a marker formed along the mounting nut opening to be near the adjustment shaft and marks formed on the adjustment shaft having at least one location mark whereby the marker may be registered with respect to the shaft calibration mark to preserve the proper threading of the adjusting shaft with respect to the mounting nut.

9. The aiming device of claim 8, wherein the calibration marks are narrow ring markings formed on the adjustment shaft.

10. A vehicle lamp aiming device comprising:
    a) an adjusting shaft having a first coupling, a threaded portion, and a marker support portion,
    b) a rotationally adjustable mounting nut, with an internal threaded passage threaded to the adjusting shaft, a mounting face in contact with an element fixed to a vehicle, having means for being anchored with reference to the vehicle, and having at least one calibration mark positioned adjacent the marker support portion of the adjusting shaft, and
    c) a marker, adjustably coupled to the marker support portion of the adjusting shaft, and having a location mark whereby the marker may be registered with respect to the calibration marks of the mounting nut to preserve the proper threading of the adjusting shaft with respect to the mounting nut.

11. The aiming device in claim 10, wherein the adjusting shaft includes a series of calibration marks.

12. The aiming device in claim 10, wherein the marker is a clip ring.

13. The aiming device in claim 10, wherein the mounting nut includes a support frame for the marker.

14. The aiming device in claim 10, wherein the mounting nut support frame includes two parallel portions adjacent the adjusting shaft.

15. A vehicle lamp including an aiming device comprising:
    a) a light source,
    b) a reflector housing enclosing the light source, and including a first coupling formed on the exterior of the reflector housing,
    c) an adjusting shaft having a first coupling, a threaded portion, and at least one shaft calibration mark,
    d) a mounting nut, with an internal threaded passage threaded to the adjusting shaft, a mounting face in contact with an element fixed to a vehicle, and a marker support, and
    e) a marker positioned on the mounting nut having at least one location mark whereby the marker may be registered with respect to the shaft calibration mark to mark the threading of the adjusting shaft with respect to the mounting nut.

16. The headlamp in claim 15, wherein the adjusting shaft includes a series of calibration marks.

17. The headlamp of claim 16, wherein the calibration marks are narrow ring markings formed on the adjustment shaft.

18. The headlamp of claim 15, wherein the marker is a clip ring.

19. The headlamp of claim 15, wherein the mounting nut includes a support frame for the marker.

20. The headlamp of claim 19, wherein the marker is adjustable along a length of the support frame.

21. The headlamp of claim 19, wherein the marker is an adjustable clip coupled along a length of the support frame.

22. The headlamp of claim 19, wherein the mounting nut support frame includes two parallel portions adjacent the adjusting shaft.

* * * * *